No. 608,311. Patented Aug. 2, 1898.
J. W. THAYER.
CREAM SEPARATOR.
(Application filed Dec. 16, 1897.)
(No Model.)
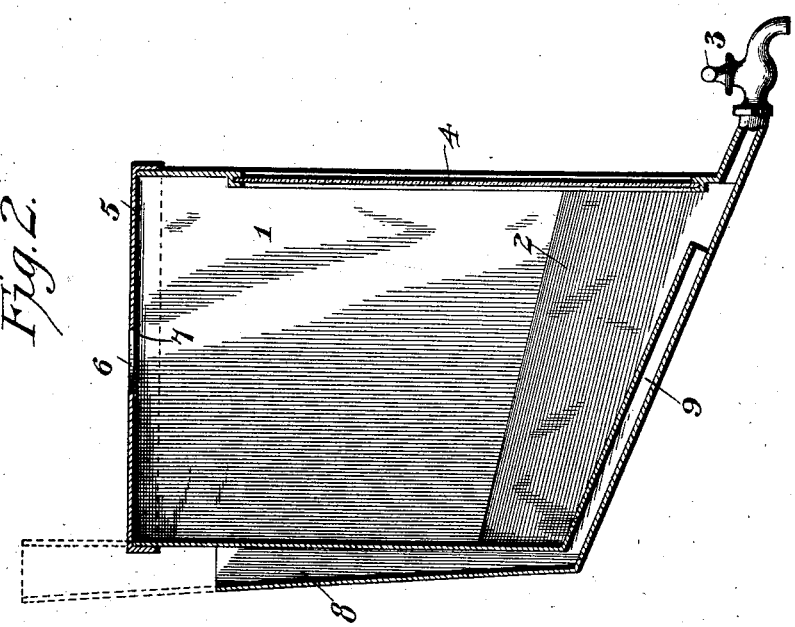
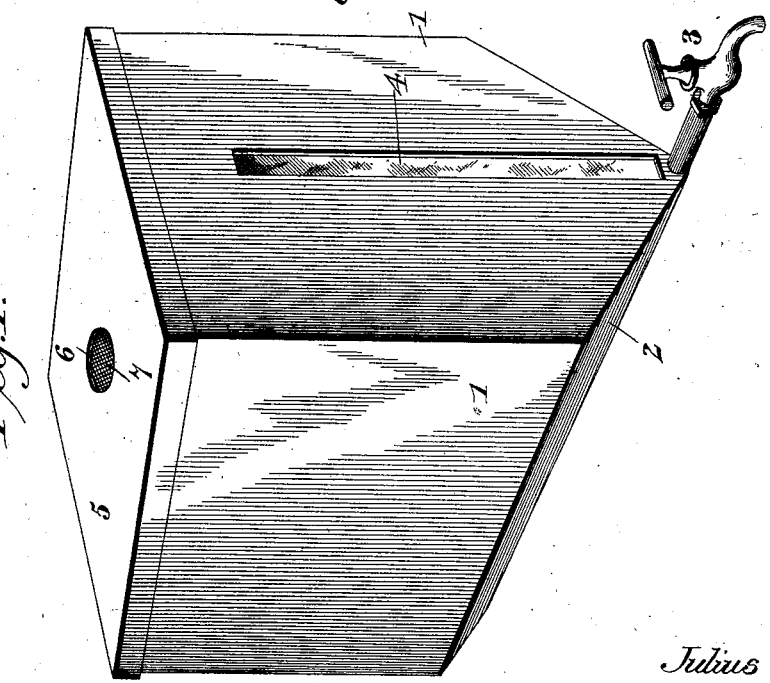
Witnesses
Inventor
Julius W. Thayer
By his Attorneys,

United States Patent Office.

JULIUS W. THAYER, OF MILTON, IOWA, ASSIGNOR OF TWO-THIRDS TO HARRY H. COOPER AND ISOM W. COOPER, OF SAME PLACE.

CREAM-SEPARATOR.

SPECIFICATION forming part of Letters Patent No. 608,311, dated August 2, 1898.

Application filed December 16, 1897. Serial No. 662,219. (No model.)

*To all whom it may concern:*

Be it known that I, JULIUS W. THAYER, a citizen of the United States, residing at Milton, in the county of Van Buren and State of Iowa, have invented a new and useful Cream-Separator, of which the following is a specification.

My invention relates to cream-separators, and particularly to a device adapted to cause the separation of cream from milk by exposing the same to a liquid agent of lower temperature than the milk.

Further objects and advantages of this invention will appear in the following description, and the novel features thereof will be particularly pointed out in the appended claims.

In the drawings, Figure 1 is a perspective view of a separator constructed in accordance with my invention. Fig. 2 is a vertical central section of the same.

Similar numerals of reference indicate corresponding parts in both figures of the drawings.

The body portion or receptacle 1 of the separator embodying my invention is preferably of cross-sectionally rectangular construction, although it will be understood that this feature may be varied in practice, as may be found desirable. The bottom of the receptacle, however, is preferably inclined downwardly from the side walls to a central longitudinal line, as shown at 2, and this central line is in turn inclined downwardly from the rear wall of the receptacle toward its front wall, whereby the lowest point of the bottom of the receptacle is at the center of the front wall, where a faucet 3 is arranged in communication with the interior of the receptacle. Vertically above the faucet, and hence on the central vertical line of the front wall of the receptacle, is arranged a sight-pane 4, consisting of a transparent panel through which the level and the line of separation of the contents may be observed. The cover 5, which is removably fitted upon the receptacle, is provided with a central ventilating-opening 6, fitted with a gauze screen 7.

Arranged, preferably, exteriorly of the receptacle, at the center of its rear wall, is an inlet-tube 8, having its open upper end located contiguous to the plane of the cover 5 and extending downwardly to the inclined longitudinal center of the bottom. At this point the inlet-tube is provided with a bend or elbow, and a forwardly and downwardly inclined extension 9 follows said central line of the bottom from the plane of the rear wall of the receptacle to a point contiguous to the front wall, and hence approximately to the lowest point of the receptacle adjacent to the faucet.

In operation the milk while warm (as immediately after milking) is strained and introduced into the receptacle, after which water at a lower temperature than the milk (and preferably at a considerably lower temperature) is introduced through the tube 8 and gains access to the interior of the receptacle at the lowest point thereof. Obviously the extension of the inlet-tube approximately throughout the longitudinal center of the bottom of the receptacle has the effect of chilling the contiguous portions of the contents, and as the water enters and commingles with the milk the chilling thereof results in the separation of the cream which, rising to the top, remains supported by the heavier contents of the receptacle until the latter have been withdrawn through the faucet. The mixture of milk and water may be withdrawn to lower the level of the under surface of the cream to the most depressed point of the bottom of the receptacle, this point in the operation being visible through the sight-pane.

It will be seen that in addition to the advantage gained by introducing the cooling agent at the lowest point of the bottom of the receptacle the inclination of the longitudinal center of said bottom and the lateral inclination of the side portions of the bottom have the effect of concentrating a lower stratum of the contents contiguous to the faucet, whereby in drawing off the milk almost the entire quantity thereof may be removed without disturbing the cream. The usual time necessary for accomplishing the complete separation of the cream from the milk is from twenty to thirty minutes, as I have discovered in practice.

In the drawings I have illustrated in dotted lines the inlet-tube as extended above the plane of the cover; but it will be understood that under ordinary circumstances such extension is unnecessary.

Various changes in the form, proportion, and the minor details of construction may be resorted to without departing from the spirit or sacrificing any of the advantages of this invention.

Having described my invention, what I claim is—

1. A cream-separator having a receptacle provided with a bottom of which the side portions are inclined downwardly and inwardly to the longitudinal center thereof, said longitudinal center being inclined downwardly from the rear toward the front wall of the receptacle, a faucet communicating with the receptacle at the most depressed point of its bottom, and an inlet-tube having an exposed inlet end, and an extension 9 arranged within the receptacle upon the inclined longitudinal center of its bottom, with its outlet end located contiguous to the said most depressed portion of the bottom of the receptacle, substantially as specified.

2. A cream-separator having a receptacle of which the bottom is inclined laterally from the side walls toward a central longitudinal line, this longitudinal center being inclined downwardly from the rear toward the front wall, a removable cover fitted upon the receptacle and provided with a ventilating-opening fitted with a gauze screen, a faucet communicating with the interior of the receptacle at the lowest point of its bottom, a vertical sight-pane through which the contents of the receptacle may be observed, and an inlet-tube having an exposed inlet end, and arranged at its outlet end contiguous to said depressed point of the bottom, an intermediate portion of the inlet-tube extending through the receptacle, substantially as specified.

In testimony that I claim the foregoing as my own I have hereto affixed my signature in the presence of two witnesses.

JULIUS W. THAYER.

Witnesses:
HARRY H. COOPER,
I. W. COOPER.